March 1, 1966 C. E. PALMER ETAL 3,237,915
SLUICE GATE
Filed July 18, 1963 2 Sheets-Sheet 1

INVENTORS
CHARLES EDWARD PALMER
ROBERT H. PALMER
JOHN A. OLDENBURG
BY
Charles L. Lowendahl
attorney

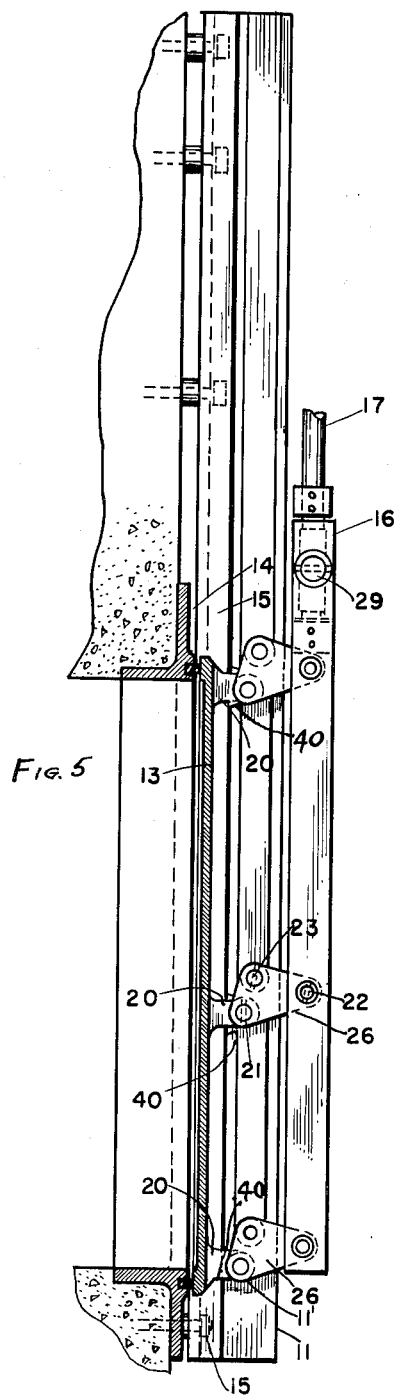
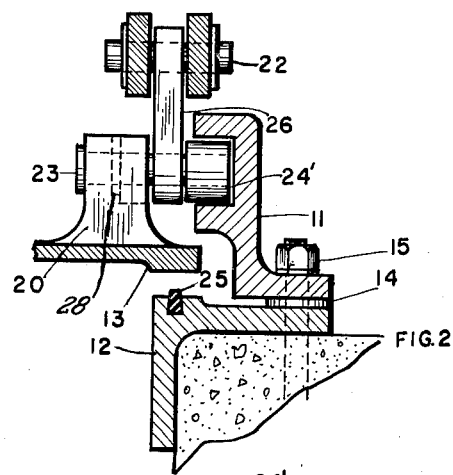
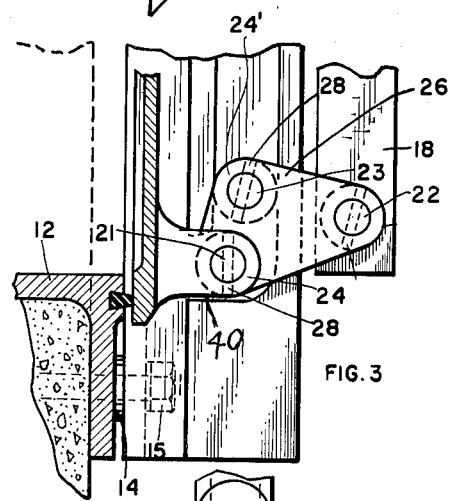
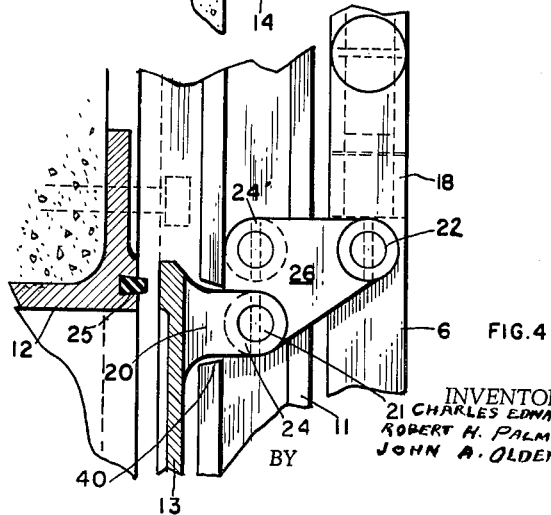

United States Patent Office

3,237,915
Patented Mar. 1, 1966

3,237,915
SLUICE GATE
Charles Edward Palmer, Robert H. Palmer, and John A. Oldenburg, Lake City, Pa., assignors to Palmer Filter Equipment Company, Erie, Pa., a partnership firm
Filed July 18, 1963, Ser. No. 295,985
2 Claims. (Cl. 251—158)

This invention relates to valves and, more particularly, to the type of valves known as sluice gates.

The sluice gate arrangement disclosed herein was invented for the purpose of requiring a positive sealing, non-leaking sluice gate. The sluice gate disclosed will also reduce maintainence costs to a minimum by eliminating all frictional wear to the gate closure surfaces caused by head pressure on the upstream side of the gate.

This invention provides a definite means of horizontal movement of the gate to and from sealing contact with the gate closure surface while also providing for the necessary vertical movement required to control flow or intermediate opening and closing of the gate. The design also eliminates the need of bronze contact sealing replacements which have been worn due to frictional wear as well as adjustment and replacement of adjusting wedges heretofore in common use.

The horizontal movement of the gate is accomplished by vertically spaced links attached to each side of the valve. These links are spaced vertically so that the valve is held in positive vertical alignment during its upward and downward movement. If the valve were not supported by more than one link at a side of the valve, when the valve was slightly opened, there would be an unbalance of force around the supporting link due to the liquid pressure on the upstream side of the valve. This would cause the valve to rotate about the supporting links and if the valve were moved upward slightly, the liquid force would cause the bottom part of the valve to move in a downstream direction and the upper part of the valve to move in an upstream direction into engagement with the supporting structure. Therefore, the valve would bind and would not operate. By providing the vertically spaced supporting links at each side of the valve member, the valve disclosed herein will move straight up and straight down in a vertical plane and will function smoothly and easily.

Constant positive self-adjusting seal contact is maintained since the door is forced into engagement with the sealing surface at the conclusion of the closing cycle by means of cam levers forcing the gate against the seal which is a component part of the gate orifice frame.

It is accordingly, an object of the present invention to provide an improved sluice gate.

Another object of the invention is to provide a sluice gate with an improved actuating means.

A further object of the invention is to provide a sluice gate which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawings:

FIG. 2 is an enlarged partial cross sectional view taken on line 3—3 of FIG. 1;

FIG. 3 is an enlarged partial cross sectional view taken on the line 2—2 of FIG. 1;

FIG. 4 is an enlarged partial cross sectional view taken on the line 4—4 of FIG. 1; and FIG. 5 is a vertical cross sectional view taken on line 5—5 of FIG. 1.

Figure 1:
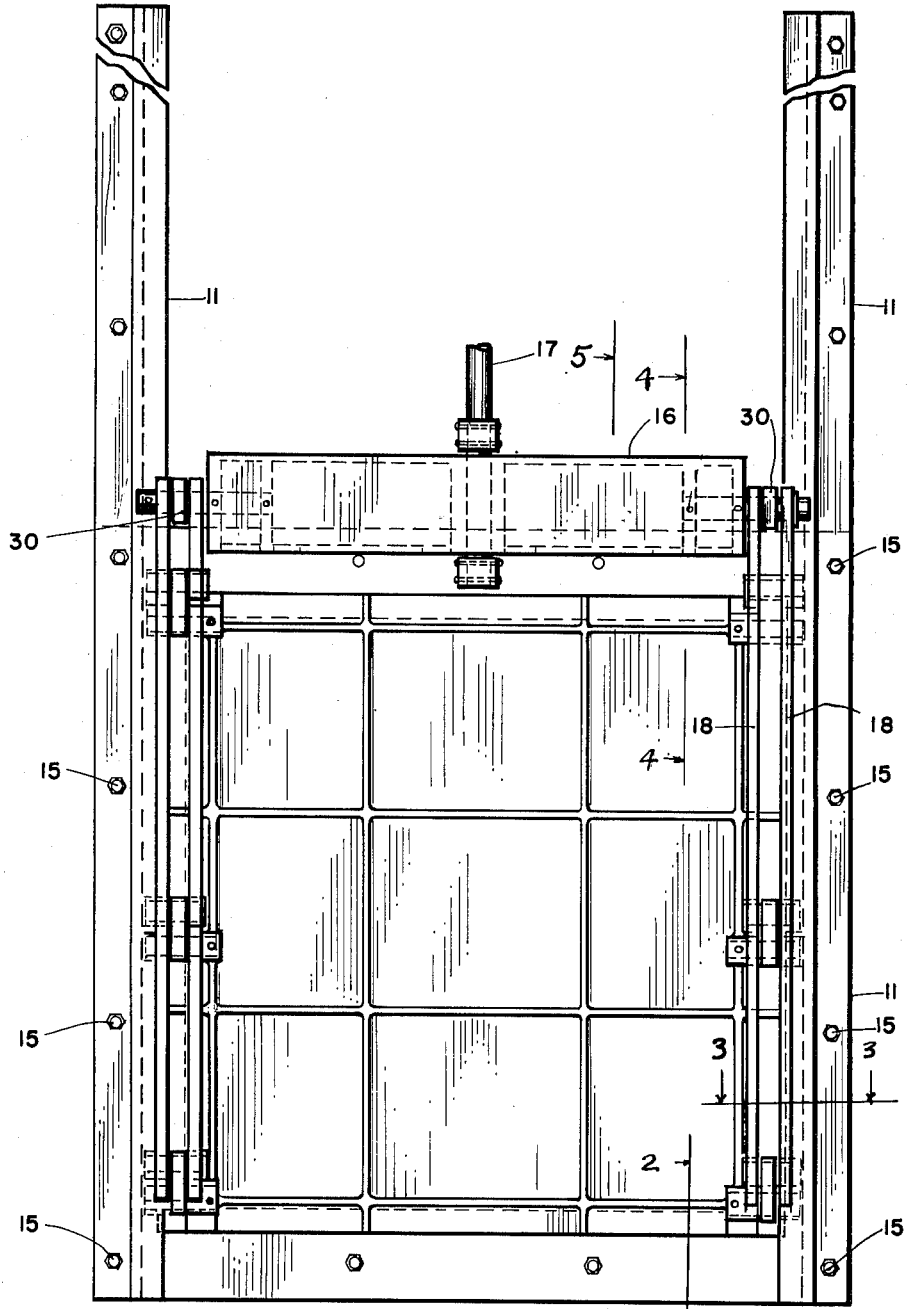
FIG. 1 is an end view of a sluice gate according to the invention.

Now with more particular reference to the drawings, a sluice gate is provided with an orifice frame 12 and a gate valve member 13 for opening and closing the orifice in the frame 12. The gate is slidable up and down between channel tracks 11 which are attached to the concrete at each side of the frame 12 by studs 15. The gate itself is carried on the track guides by rollers 24 which are attached to the gate and ride in the channel tracks 11.

The tracks 11 receive the rollers 24' which are supported on axles 23 and attached to an intermediate part of the links 26. The rollers 24' move up and down in the tracks 11. The inner ends of the links 26 are swingably connected to the gate member 13 by pins 21. The outer ends of the links 26 are connected to operating bars 18 which are in turn, connected to an operating shaft 17 by lugs 29.

As operational effort is applied to the operating bars 18, this effort actuates movement of the roller-cam lever assemblies within the confines of the tracks 11; both in a horizontal and vertical position, dependent upon the stage and degree of operation. When force is first applied, the rollers 24 first move from the position shown in FIG. 3 where they are disposed in a slot 40 to the position in tracks 11 shown in FIG. 4.

When the gate valve member 13 is raised to full or partial open position, the rollers 24 and 24' are both contained within the tracks 11. In this position, there can be no contact between the contact face of the gate member 13 and the seal 25 since both the rollers 24 and 24' hold the links 26 against movement. As the gate valve member 13 is lowered in closing, this condition of non-contact is maintained until such time as the bottommost rollers 24 contact a channel stop 11' which is fixed to frame 12 at the bottom of the tracks 11.

Continued downward closing effort on the operating bars 18 causes further depression of the outer portion of cam lever link 26, the force being transmitted by link 26 through pins 22. This causes the cam lever link 26 to start rotating around axle 23 with the roller 24' thereon acting as a fulcrum. Since the roller 24' is attached to the cam lever link 26 by axle 23, it cannot move horizontally because of the vertical portion of the channel track 11, the roller 24 is attached to the inner end of the cam lever link 26 by pin 21 and is then forced to move in a horizontal direction bringing the rollers 24 through the lateral outlet slots 40 in the tracks 11.

The tracks 11 are so designed that when the rollers 24 are attached to the cam lever links 26 by pins 21 are in the closing position, they are then in alignment with the outlet slots in the downstream side of the tracks 11. The slots therefore allow the rollers 24, as above noted, to move in a horizontal pivotal movement around the axle 23.

Since rollers 24 at pin 21 are also attached to the gate member 13 through gate mounting lugs 20, the gate member 13 itself is likewise moved horizontally to a point of contact with the seal 25, thereby effecting complete sealing and closure of the sluice gate in the closing cycle.

The pins 21 and axles 23 are attached respectively to the "lugs 20" and "links 26" by pins 28.

On the opening cycle, upward effort is applied to the master operating shaft 17 which is, in turn, transmitted to lugs 29, pins 30, truss 16, bars 18, and cam lever links 26 and hence through the pins 22, rollers 24 and 24', pins 21 and axle 23 to the gate member 13.

As the cam lever links 26 are raised at points of pin 22, the effort is transferred to the rollers 24' at the point of axles 23. Since horizontal movement of the rollers is restricted by the channel tracks 11, pivotal movement begins again which causes the rollers 24 at pins 21 to withdraw from the slots in the channel tracks 11. The weight of the gate member 13 and upstream pressure against the gate member 13 negates any possibility of vertical movement during this initial raising procedure.

As upward effort on the operating bars 18 continues, both the rollers 24 and 24' at pins 21 and axles 23 are brought into vertical alignment. At this point of operation, the gate number 13 is withdrawn completely clear of the seal 25 and is free to rise with continued upward effort. All upstream pressure is transferred to the rotating action of the revolving rollers 24 and 24' in the channel tracks 11 so that applied effort becomes primarily that of lifting the gate member 13. All contact friction between the gate closure surfaces is eliminated.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A sluice gate comprising a frame,
    said frame comprising a flange member defining an opening for the stream of a sluice,
    a sealing member on said frame around said opening,
    a channel roller guide member at each side of said flange member,
    the open sides of said channel members facing each other,
    means closing the bottom ends of said channel members,
    a gate,
    at least two vertically spaced ears fixed to a first side of said gate, at least one ear fixed to said gate at the side thereof opposite said first mentioned ears,
    links,
    each said link having one end thereof swingably attached to one said ear,
    an intermediate part of each said link having a roller pivotally supported thereon and movable in a said channel member,
    said links having an operating member attached to the distal ends thereof and being swung toward a parallel relation with said gate whereby said gate is moved away from said sealing member,
    said links being swung toward perpendicular relation with said gate when said operating member is forced up whereby said rollers engage said channel members and force said gate into sealing relation with said sealing member.

2. A valve comprising
    an orifice frame defining an opening,
    a valve member for closing said opening,
    spaced parallel channel tracks attached to said frame with said channels opening toward each other,
    one leg of each said channel track being adjacent said frame having spaced openings therethrough,
    a valve member,
    at least two vertically spaced cam levers adjacent one side of said valve member, at least one cam lever adjacent the other side of said valve member,
    each said cam lever having one part swingably attached to said valve member at a first position,
    a second position spaced from said first position of said lever being connected to an operating member,
    each said lever having a first roller attached thereto at a position spaced from said first and second positions,
    second rollers attached to said levers at said first positions,
    and being disposed in said channel tracks,
    said second rollers aligned with said openings in said channel tracks when said valve member is in closed position,
    said first rollers moving through said openings in said legs of said channel tracks into said channel tracks,
    said first and second rollers guiding said valve member to a position out of the flow path of fluid when said valve member is being opened,
    and a stop on said valve member stopping the movement of said valve member in a direction toward closing when said second rollers aligned with said openings in said channel tracks whereby said second rollers may move through,
    said slots and said valve member is forced to sealing position when a closing force is applied to said operating member.

References Cited by the Examiner

UNITED STATES PATENTS

| 989,202 | 4/1911 | Snow | 251—158 |
| 1,328,752 | 1/1920 | Moody | 251—158 |
| 1,592,986 | 7/1926 | Martin | 251—158 |
| 2,885,175 | 5/1959 | Irving | 251—203 X |
| 3,120,944 | 2/1964 | Cogez | 251—158 |

FOREIGN PATENTS 1,088,002  9/1960  Germany.

ISADOR WEIL, *Primary Examiner.*